United States Patent Office 3,117,015
Patented Jan. 7, 1964

3,117,015
ROOFING COMPOSITION
Edward I. Baker and Leonard S. Schwartz, Shaker Heights, Ohio, assignors to Monroe Company, Inc., Cleveland, Ohio
No Drawing. Filed Aug. 4, 1961, Ser. No. 129,256
2 Claims. (Cl. 106—278)

This application, relating as indicated to a roofing compound, is particularly directed to an asphalt roofing compound having a minor percentage of a polyorganosiloxane of the general formula

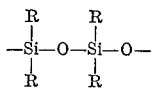

where R is a hydrocarbon radical, such as $CH_3$ or $C_2H_5$, from .01 to 2 percent of the roofing mixture. Particularly, this invention relates to an asphalt base roofing compound, and this may be Trinidad pitch or petroleum asphalt in equal proportions or having all or a predominate proportion of either, together with the polyorganosiloxane mentioned above, as well as possibly up to 2½ percent pine tar oil and possibly from 4 to 7 percent of pure asbestos fiber.

An object of this invention is to produce a more durable asphalt roofing compound which is resistant to oxidation, is of tougher construction, and has a lesser tendency to crack and leak under conditions of the elements.

A further object of this invention is to produce a roofing compound which will have fairly consistent viscosity over the application range because of the inherently constant viscosity of the polyorganosiloxane resin addition and at the same time will have a toughness, as distinguished from a brittleness, that is more constant over the temperature changes from $-10°$ or $-20°$ F. to 110° F. which are experienced in temperate and even tropical climates.

To the accomplishment of the foregoing and related ends said invention, then, consists of the means hereinafter fully described and particulraly pointed out in the claims; the following description setting forth in detail one approved method of carrying out the invention, such disclosed method, however, constituting but one of the various ways in which the principle of the invention may be used.

This invention relates to an asphalt roofing compound consisting of Trinidad pitch or petroleum asphalt, though we prefer to use a blended, vacuum distilled, oxidized asphalt. Either the natural or the petroleum asphalt is satisfactory, though we prefer to use a blend of domestic and Venezuelan asphalt cutback having a flash point above 90° F. by standard ASTM method D92–42. Preferably the mixture is 50 percent domestic petroleum asphalt and 50 percent Venezuelan asphalts. Of the entire mixture the asphalt ranges from 50 to 75 percent, though in the preferred composition the asphalt percentage is 60 percent. With the asphalt we use a polyorganosiloxane resin of the general formula

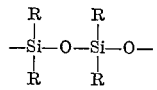

where R is a hydrocarbon radical, such as $CH_3$ or $C_2H_5$. In this formula R may be either a methyl or an ethyl group. An example of this composition might be Dow Corning silicone resin XR–129G. This XR–129G is a silicone prepared by reacting methyl chloride with silicon at a temperature of 200° C. to 500° C. in the presence of copper as a catalyst. The major constituents of this reaction are $CH_3SiCl_3$, $(CH_3)_2SiCl_2$, and a byproduct of chlorosilanes, which has a boiling point above 69.8° C. at atmospheric pressure. After the methyl chlorosilanes ($CH_3SiCl_3$ and $(CH_3)_2SiCl_2$) are removed from the reaction product, the remaining chlorosilanes byproduct is removed from the non-volatile residue by flash distillation. To a mixture of 420 parts of the byproduct chlorosilane compounds and 50 parts toluene was added 227 parts of isopropanol. This amount of isopropanol was equivalent to 55 molar percent of the chlorine present in the mixture of byproducts. Then 34 parts of water were added. The reaction mixture was heated to about 75° C. to 85° C. for three hours, then to a temperature of 150° C. at atmospheric pressure to distill off the volatiles. The resulting product was a fluid having a viscosity of about 50 centistokes at 25° C. It had an analysis of 23 percent by weight silicon and 41 percent by weight isopropoxy. When thin films of this fluid were exposed to atmospheric moisture, non-tacky resinous films were formed. It would have a viscosity at 77° F. of 5 to 50 centipoises and a specific gravity of 1 to 1.20. The percentage of solids by weight in xylene is 90 percent. As an example of these polyorganosiloxane resins, it might be one having a viscosity in centipoises at 77° F. of 25 and a specific gravity of about 1.10. This would be used in a composition for a roofing material and would represent something within the range .01 to 2 percent polyorganosiloxane (in this case 1 percent), together with 60 percent asphalt and other solvents and diluents to be described later.

The addition of the polyorganosiloxane to this roofing compound reduces the drying rate of the material rather sharply. It also makes the material tougher and not as brittle and has a lesser tendency to crack and leak under conditions of adverse weather and surprising differences in temperature. By this it is meant that the material has a toughness which transcends the complete range of temperature conditions that are experienced in temperate and tropical climates, perhaps from $-20°$ F. to 100° or 125° F. For some asphalt roofing compounds the material cracks and leaks under these conditions, but because of the natural resistance of the polyorganosiloxane to these temperature changes, there is an extremely small change of hardness in the resin with thermal changes. When this is combined with the high oxidation resistance and chemical stability of the polyorganosiloxane when combined with these materials, it will be seen that the composition itself is more chemically stable and resistant to oxidation because of the improved weathering ability and the oxidation resistance of the compound itself, mixed, as it is, in the asphalt roofing materials.

In application the same fairly constant temperature coefficient of viscosity is used again as the material may be spread more easily over varying temperature conditions and can be more accurately gauged in its formulation to provide the correct viscosity. With this asphalt roofing compound we may use pure asbestos fiber and this fiber may be from 4 to 7 percent of the compound and in the preferred example it varies from 4½ to 5 percent. There are suitably designated tests for the characteristics of this fiber, but they are no part of this application, and generally they may be tested in a mechanically vibrated screen just prior to the mixing of the coating in order to puff up the material and remove therefrom all foreign substances and lumps. In addition, zero percent shall be retained on 2 mesh screen, zero percent shall be retained on 4 mesh screen, not less than 30 percent shall pass through 4 mesh screen and shall be retained on 10 mesh screen, and 70 percent shall pass 10 mesh screen. This asbestos fiber shall contain no other mineral fillers or any organic fibers. This is, of course, important because of the requirements of certain standard ASTM tests, as well as certain U.S. Government specifications and is only given here by way of example.

In addition, we plan to use from 1 to 3½ percent pine oil, preferably 2½ percent in the preferred embodiment. By pine oil we means a medium pine tar oil, principally one having isomeric tertiary and cyclic terpene alcohols with variable quantities of terpene hydrocarbons, ethers, ketones, phenols and phenolic ethers. The preferred compound is one that has a flash point of 210° F. minimum, an iodine number 130, and a Furol viscosity at 50° C. of 75 to 100.

With these materials it is desirable to use a petroleum distillate as a solvent, and this solvent may vary from 10 or 15 percent to as much as 40 percent of the compound. In a preferred embodiment this would be 33 percent. This is a petroleum distillate having an API gravity of 40°–45° and having a flash point in a Cleveland open cup of 150° F. minimum. When this material is applied to a suitable roof it should leave not less than 60 percent non-volatile matter and this is tested by taking 10 grams and heating to 105° for 24 hours. Other standard tests for a better type material would be U.S. Government specification SS–R–451, particularly directed to black asphalt liquid roof coatings, and samples of the tests which this material must meet are as follows. A metal panel 3 by 5 inches is covered with a coating at the rate of one gallon per 100 square feet, baked at 150° F. for 5 hours and allowed to cool for one hour to room temperatures and then further cooled to 0° C. for one hour. Then it may be bent over a 1-inch mandrel and the panel shall show no cracking or separation of the coating. With this addition of polyorganosiloxane the coating is tougher, particularly when subjected to these rapidly varying temperatures.

A further test of this material is to take a metal panel 5 by 12 inches, prepared according to the previous thickness, and the panel shall be exposed facing south at an angle of 45° to the vertical, to the direct action of the sun for a period of three years and shall show no alligatoring, blistering, cracking or separation.

We wish it to be understood that we do not confine ourselves to the precise details herein set forth in the preferred manner of carrying out our invention as it is apparent that many changes and variations may be made by those skilled in the art without departing from the spirit of the invention or exceeding the scope of the appended claims.

We claim:
1. A roofing composition consisting essentially of 50–75 percent by weight of asphalt, 4–7 percent by weight of asbestos fibre, 1–3.5 percent by weight of pine oil, 10–40 percent by weight of a petroleum-distillate solvent, and 0.01–2.0 percent by weight of a diethyl silicone polymer having a viscosity of about 5–50 centipoises at 77° F.

2. A roofing composition consisting essentially of 60 percent by weight of asphalt, 4–5 percent by weight of asbestos fibre having a particle size of which approximately 70 percent will pass through a 10-mesh screen, 2.5 percent by weight of pine oil, 25–35 percent by weight of petroleum-distillate solvent, and 1.0 percent by weight of a dimethyl silicone polymer having a viscosity of about 5–50 centipoises at 77° F.

References Cited in the file of this patent
UNITED STATES PATENTS

| | | |
|---|---|---|
| 2,581,685 | McMillan | Jan. 8, 1952 |
| 2,661,300 | Romberg et al. | Dec. 1, 1953 |

OTHER REFERENCES

"Dow Corning Silicone Notes," Technical Data, Product: Dow Corning Resin, XR–129g, Dow Corning Corporation, Michigan, 1951.

"Dow Corning Silicone Notes," Technical Data, Subject: Dow Corning 555 Fluid, Dow Corning Corporation, Michigan, April 1957.